(No Model.)
F. REIFSCHNEIDER.
ALBUM.
No. 386,607. Patented July 24, 1888.
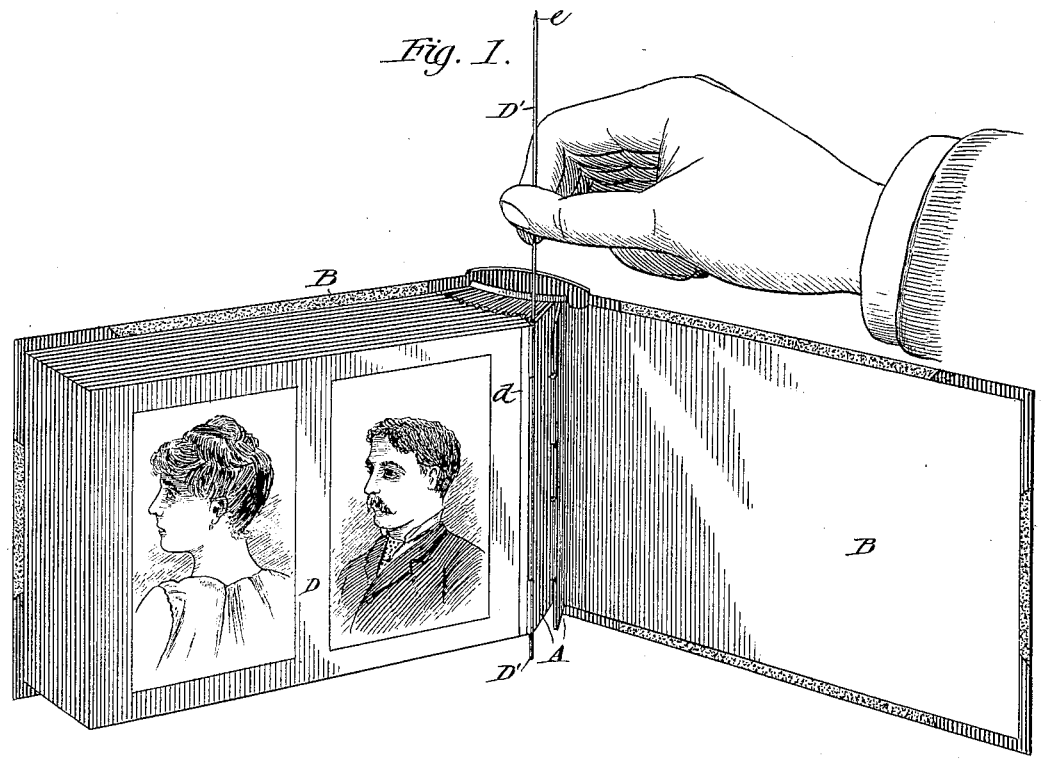
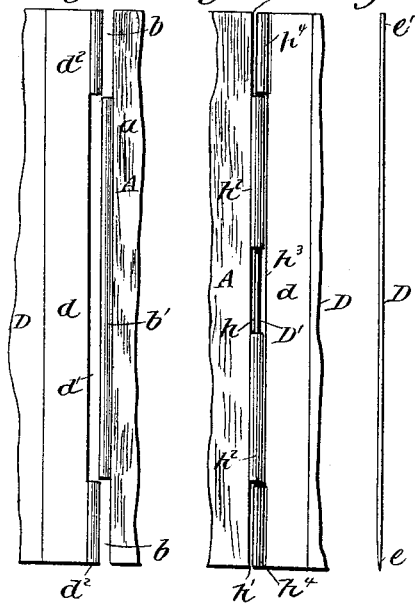
WITNESSES:
J. E. Clark.
C. Sedgwick.
INVENTOR:
F. Reifschneider
BY
ATTORNEYS.

UNITED STATES PATENT OFFICE.

FELIX REIFSCHNEIDER, OF BROOKLYN, NEW YORK.

ALBUM.

SPECIFICATION forming part of Letters Patent No. 386,607, dated July 24, 1888.

Application filed January 18, 1888. Serial No. 261,126. (No model.)

*To all whom it may concern:*

Be it known that I, FELIX REIFSCHNEIDER, of Brooklyn, in the county of Kings and State of New York, have invented a new and Improved Album, of which the following is a full, clear, and exact description.

My invention relates to an album the leaves of which form photographic mounts and are readily attachable and detachable, the object being to provide an album for the use of amateur photographers, the leaves forming mounts upon which the photographs may be pasted and afterward burnished without damaging in any way their means of attachment.

The invention consists in the construction and arrangement of parts, as will be hereinafter fully described and claimed.

Reference is to be had to the accompanying drawings, forming a part of this specification, in which similar letters of reference indicate corresponding parts in all the figures.

Figure 1 is a perspective view of the album, illustrating the method of detaching the leaves. Fig. 2 is an elevation of a detached and separated leaf and stub, partly broken away. Fig. 3 is a modified form of leaf and stub; and Fig. 4 is an elevation of the pintle.

I provide a series of stubs, A, consisting of a card-board or other stiff and flat substance, or a body, which body is provided with a covering, $a$, of muslin, felt, leather, or equivalent material, glued or otherwise attached thereto and to the inner sides and back of the outer covering, B, as illustrated in Fig. 1, the attachment of the said stubs to the cover B being effected in any suitable manner known to the trade. If found desirable, the covering for the stubs may consist of one continuous strip embracing all the said stubs adapted to be bound together. The stubs are cut away or recessed at each end, as shown at $b$ in the detail view, Fig. 2, and the covering between said recesses as folded over to form one continuous eye, $b'$.

The leaves D are provided at their inner ends with a covering, $d$, of similar material to the stub-covering, and centrally in said end a recess, $d'$, is produced of sufficient length to receive the eye $b'$ of the stub, and above and below said recess the covering is folded upon itself to produce the eyes $d^2$, which eyes are adapted to enter the recesses $b$ in the stub and align the eye $b'$, as shown in Fig. 1. The object in thus providing the leaves or mounts D with muslin, leather, felt, or other flexible hinge-eyes is to allow the mounts to be passed through a burnishing-machine without injuring said eyes. The textile, felt, leather, or other fabric is thin, but strong, and does not thicken the leaf or mount sufficiently to interfere with the action of the burnisher or to be injured thereby.

A pintle, D', is employed to unite the stubs and leaves and complete the hinge-connection, the said pintle, which may be made of wood, bone, ivory, metal, or equivalent material, being provided with a pointed lower extremity, $e$, and a flat head, $e'$, as shown in Fig. 4.

The pintle is passed respectively through the eyes $d^2$ of the leaves and the eye $b'$ of the stub. When it is desirous to remove a leaf for any cause, the head of one pintle is placed in contact with the pintle of the desired leaf, as illustrated in Fig. 1, and the latter pintle is thereby readily forced out, whereupon the leaf becomes detached from the stub.

For convenience in removing the pintles without the aid of an auxiliary one, I provide the stub with a central recess, $h$, end recesses, $h'$, and eyes $h^2$, intervening the said end and central recesses, as illustrated in Fig. 3, the leaf being provided with a central recess, $h^3$, accommodating the eyes $h^2$, and eyes $h^4$ entering the recesses $h'$. When the pintle is passed through the eyes, hinging the leaves to the stubs, the pintle is in this case visible at the central recess, $h$, and may be readily grasped by the fingers and removed. I purpose, as illustrated in Fig. 1, hinging the last leaf in this manner in order that the pintle of that leaf may be employed to remove the rest; but if found desirable every leaf may be so hinged.

An album thus constructed may be used for holding samples or be utilized as a scrap-book. It will be observed that when the book is opened the stubs prescribe the arc, and that the leaves, by reason of the hinge, lie at right angles to the stubs flatly one upon the other.

Having thus described my invention, what I claim as new, and desire to secure by Letters Patent, is—

1. The combination, with the album provided with a series of stubs having eyes, of the leaves forming mounts and having strips of textile or other non-metallic fabric pasted along their inner edges and forming eyes at the bends registering with the spaces between the stub-eyes, and the pintles passed through said eyes and removable therefrom, whereby any mount may be removed, passed through a burnisher, and then replaced, substantially as set forth.

2. The combination, with the album provided with a series of stubs having eyes, of the series of mounts having flexible eyes of textile or other non-metallic fabric, and the removable pintles connecting said eyes, one pintle being exposed between its ends, whereby it may be grasped, pushed outward, and removed to serve as means for forcing the other pintles outward, substantially as set forth.

FELIX REIFSCHNEIDER.

Witnesses:
J. F. ACKER, Jr.,
C. SEDGWICK.